US010549226B2

(12) United States Patent
Cho (10) Patent No.: US 10,549,226 B2
(45) Date of Patent: Feb. 4, 2020

(54) FRAMELESS SELF-LOCK FILTER AND AIR CLEANER USING THE SAME

(71) Applicants: Hyundai Motor Company, Seoul (KR); Kia Motors Corporation, Seoul (KR)

(72) Inventor: Yoon-Geun Cho, Daegu (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 182 days.

(21) Appl. No.: 15/801,768

(22) Filed: Nov. 2, 2017

(65) Prior Publication Data

US 2018/0161713 A1  Jun. 14, 2018

(30) Foreign Application Priority Data

Dec. 12, 2016  (KR) .................. 10-2016-0168668

(51) Int. Cl.
*B01D 46/00* (2006.01)
*B01D 46/52* (2006.01)
*B01D 46/10* (2006.01)

(52) U.S. Cl.
CPC ....... *B01D 46/001* (2013.01); *B01D 46/0005* (2013.01); *B01D 46/0006* (2013.01); *B01D 46/10* (2013.01); *B01D 46/521* (2013.01); *B01D 2271/027* (2013.01); *B01D 2279/40* (2013.01)

(58) Field of Classification Search
CPC ............ B01D 46/0002; B01D 46/0005; B01D 46/0006; B01D 2271/022; B01D 46/521; B01D 46/10; B01D 2279/40; B01D 46/001; B01D 2265/025
See application file for complete search history.

(56) References Cited

U.S. PATENT DOCUMENTS

| | | | | |
|---|---|---|---|---|
| 5,125,941 A * | 6/1992 | Ernst | ............... | B01D 46/0006 55/480 |
| 6,174,343 B1 * | 1/2001 | Bloomer | ............ | B01D 46/0002 123/198 E |
| 6,293,984 B1 * | 9/2001 | Oda | ................... | B01D 46/10 55/497 |
| 6,568,540 B1 * | 5/2003 | Holzmann | ........... | B01D 29/016 210/445 |
| 9,255,555 B2 * | 2/2016 | Cho | ................... | F02M 35/0203 |
| 9,464,608 B2 * | 10/2016 | Cho | ................... | F02M 35/0201 |
| 9,599,074 B2 * | 3/2017 | Cho | ................... | F02M 35/0203 |
| 2015/0020489 A1 * | 1/2015 | Sudermann | ........ | B01D 46/0001 55/502 |
| 2017/0182588 A1 * | 6/2017 | Sudermann | ........ | B01D 46/0005 |
| 2017/0304759 A1 * | 10/2017 | Foenss | ................... | A47L 9/122 |

FOREIGN PATENT DOCUMENTS

JP      2006-272106 A    10/2006

* cited by examiner

*Primary Examiner* — Robert Clemente
(74) *Attorney, Agent, or Firm* — Morgan, Lewis & Bockius LLP (57) ABSTRACT

A filter apparatus may include a frameless filter having a sealing member coupled to the edge portion of a filter paper which filters foreign matters, and a filter paper case having a seating space of the filter paper, and fitted and coupled to the sealing member to form a self-lock holding force with the sealing member.

11 Claims, 6 Drawing Sheets

FRAMELESS SELF-LOCK FILTER AND AIR CLEANER USING THE SAME

CROSS-REFERENCE(S) TO RELATED APPLICATIONS

The present application claims priority to Korean Patent Application No. 10-2016-0168668, filed on Dec. 12, 2016, the entire contents of which is incorporated herein for all purposes by this reference.

BACKGROUND OF THE INVENTION

Field of the Invention

Exemplary embodiments of the present invention relate to a frameless filter, and more particularly, to a frameless self-lock filter configured for ensuring stable filter sealing performance, and an air cleaner using the same.

Description of Related Art

In general, an air cleaner for vehicles includes a filter that filters foreign matters contained in outdoor air and an air cleaner housing that secures the airtightness of the filter while forming an internal space for housing the filter. The air cleaner is connected to an intake system and disposed in an engine compartment.

The air cleaner includes an air cleaner cover which is opened or closed in a lid type (or general type) or drawer type, to replace a contaminated filter. The lid-type air cleaner cover may be separated from the air cleaner housing. However, the drawer-type air cleaner cover may be opened in a hinged door manner, to push and dispose a filter in the longitudinal direction of the air cleaner.

The filter includes a filter paper and a filter paper case. The filter paper is folded with air permeability and filters foreign matters contained in outdoor air, and the filter paper case keeps the filter paper in a predetermined shape. Depending on the coupling structure between the filter paper and the filter paper case, the filter is divided into a frame filter and a frameless filter.

For example, the frame filter has a structure in which a filter paper and a filter paper case are integrated, but the frameless filter has a structure in which a filter paper and a filter paper case are separated from each other. In the frameless filter, the filter paper integrated with a urethane sealing member is fitted to the filter paper case, and the adhesion between the filter paper and the filter paper case can be reinforced through an operation for fixed shafts disposed at both side surfaces of the filter paper case. Then, the adhesion between the filter paper and the filter paper case can be removed through the reverse operation for the fixed shafts, to separate the filter from the filter paper case.

The frameless filter includes fewer parts than the frame filter, and the filter paper case of the frameless filter can be reused even though the filter is replaced. That is, a new filter paper can be assembled to the filter paper case. Therefore, the reuse rate can be improved.

Therefore, the air cleaner may include a drawer-type air cleaner in which one of the frameless filter and the frame filter is coupled to the drawer-type cover and a lid-type air cleaner in which one of the frameless filter and the frame filter is coupled to the lid-type cover.

The drawer-type air cleaner has a mounting structure in which the frameless filter is pushed into the internal space along the longitudinal direction and the filter paper is lifted by rotating the fixed shafts in the clockwise direction or counterclockwise direction wherein a gap of approximately 1 to 2 mm between the urethane sealing member and the air cleaner cover is removed.

Therefore, the structural limit of the drawer-type air cleaner, in which the filter must be pushed into the internal space, inevitably has a disadvantage in that the structural rigidity of the frameless filter must be first guaranteed to ensure the airtightness of the urethane sealing member.

For example, when the structural rigidity of the filter is not ensured while the filter paper coupled to the urethane sealing member is fitted to the filter paper case and assembled into the filter, the bottom surface of the filter paper may locally come off the seating surface of the filter paper case. Due to such a local come-off, the urethane sealing member may not maintain a gap (approximately 1 to 2 mm) with the air cleaner cover but interfere with the air cleaner cover, while the filter is pushed into the internal space of the drawer-type air cleaner. In the present case, a filter deformation may easily occur due to the filter paper.

Furthermore, the filter deformation in the internal space of the drawer-type air cleaner cannot be recognized by an operator with the naked eye. Thus, the filter may be mounted in a state where the urethane sealing member is not normally seated in the air cleaner cover. As a result, dust introduced into the filter may be introduced into a portion which does not form a sealing surface, as well as the surface of the non-woven fabric (filter paper). In the present case, the drawer-type air cleaner cannot accomplish the basic efficiency and dust collecting performance.

Therefore, the structural limit of the drawer-type air cleaner may not only make it difficult to ensure the filter sealing performance, but also require an excessive attention of an operator when the filter is assembled or the air cleaner is mounted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of Various aspects of the present invention are directed to providing a frameless self-lock filter which is configured for ensuring stable filter sealing performance by preventing a local come-off of a filter paper, which causes an interference with a sealing member, using a coupling between the sealing member and a filter paper case, and reducing a size while increasing the rigidity of a filter structure through the coupling between the sealing member and the filter paper case, and an air cleaner using the same.

Other aspects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, there is provided a filter including: a frameless filter having a sealing member coupled to the edge portion of a filter paper which filters foreign matters; a filter paper case having a seating space for the filter paper, and fitted and coupled to the sealing member to form a self-lock holding force with the sealing member; and a fixed shaft including a left fixed shaft coupled to the left side surface of the filter paper case and a right fixed shaft coupled to the right side surface of the filter paper case, and rotated in the clockwise or counterclockwise direction.

The filter paper may be folded with air permeability, and manufactured through a compression molding method. The filter paper may have a filter paper protrusion formed on a filter paper end portion forming the edge portion thereof, the sealing body may have a filter paper groove formed therein, and the filter paper protrusion and the filter paper groove are coupled to form a filter paper holding force.

The sealing member may include urethane, and include a sealing body seated on the edge portion of the filter paper and a locker lip integrated with the sealing body and having an insert slit fitted and coupled to the edge portion of the filter paper case, the insert slit being opened downward. The filter paper case may include a locker boss forming the edge portion thereof, the locker boss having a restriction protrusion formed thereon and a restriction groove formed under the restriction protrusion. The insert slit may have a locking protrusion formed thereon, and the restriction protrusion and the insert slit are fitted and coupled to form the self-lock holding force through the contact between the restriction groove and the locking protrusion.

In accordance with another exemplary embodiment of the present invention, there is provided an air cleaner including: a filter including: a frameless filter having a sealing member coupled to the edge portion of a filter paper which is folded with air permeability and filters foreign matters; a filter paper case fitted and coupled to the sealing member to form a self-lock holding force with the sealing member, while the filter paper is seated in a filter paper seating space; and a pair of left and right fixed shafts coupled to the left and right side surfaces of the filter paper case, respectively, and operated in the clockwise direction to form a locking status or operated in the counterclockwise direction to form an unlocking status; and an air cleaner housing having a filter mounting space in which the filter is mounted.

The air cleaner housing may include a lower housing and an upper housing which form the filter mounting space, and the upper housing has a sealing surface to form airtightness with the filter. The airtightness between the filter and the sealing surface may be formed by the sealing member.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiment, but also various alternatives, modifications, equivalents and other embodiments, which may be included within the spirit and scope of the invention as defined by the appended claims.

Figure 1:
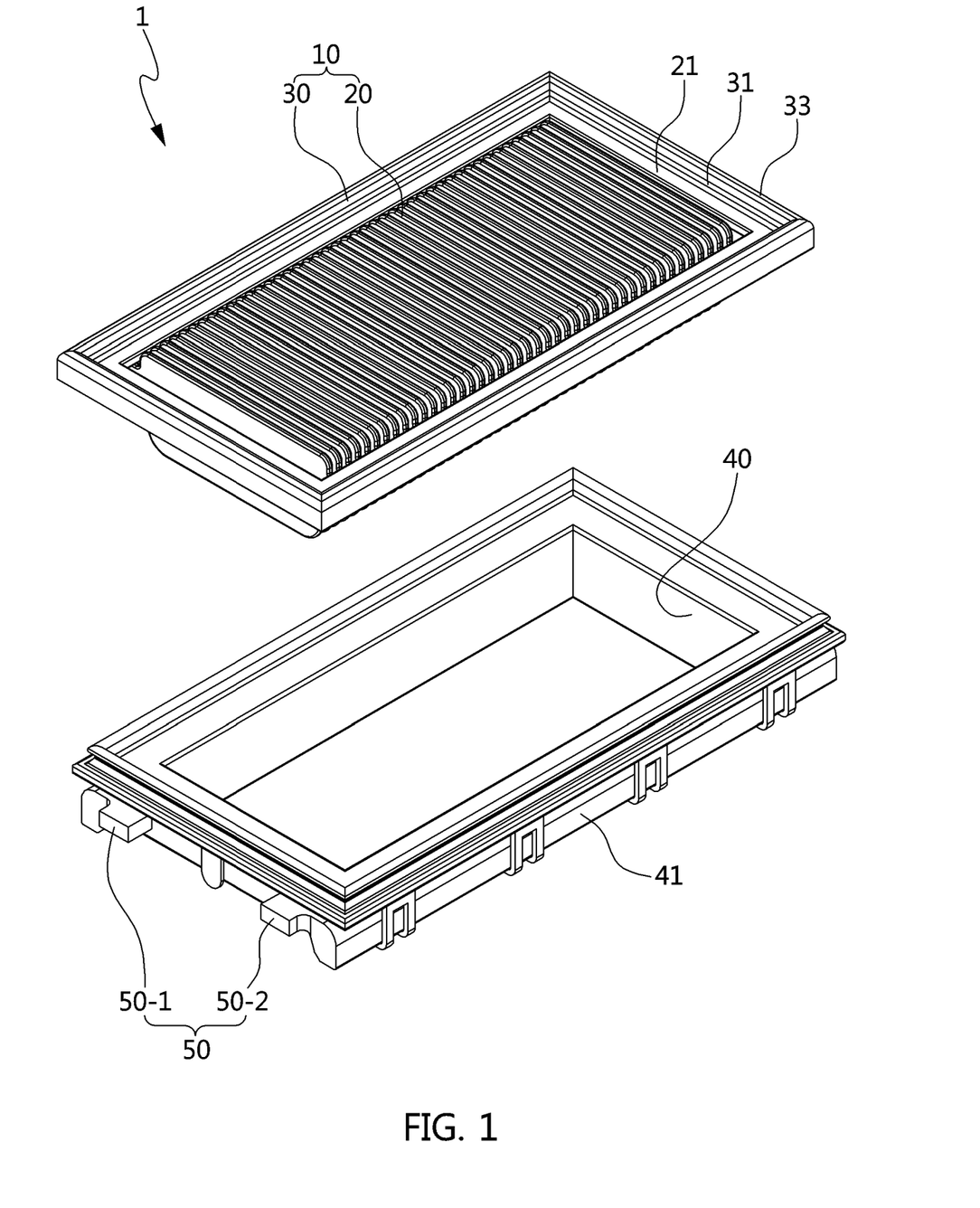
FIG. 1 is an exploded diagram of a frameless self-lock filter in accordance with an exemplary embodiment of the present invention.

Referring to FIG. 1, a filter 1 includes a frameless filter 10, a filter paper case 40 and a fixed shaft 50, and the frameless filter 10 and the filter paper case 40 form a frameless self-lock filter through a self-lock coupling therebetween.

Specifically, the frameless filter 10 includes a filter paper 20 and a sealing member 30. The filter paper 20 is folded with air permeability and filters foreign matters contained in outdoor air. The filter paper 20 includes non-woven fabric and formed in a rectangular box shape. The filter paper 20 is manufactured by a compression molding method, instead of a bending method. The sealing member 30 is coupled to the top portion surface of the filter paper 20 along the periphery of the filter paper 20, and including urethane foam. The sealing member 30 is fixed to the filter paper 20 and integrated with the filter paper 20. Thus, the frameless filter 10 is divided into a filter paper below portion on which the filter paper 20 is seated into the filter paper case 40 and a filter paper over portion which forms airtightness in the internal space of the air cleaner 100 using the integrated sealing member 30.

Specifically, the filter paper case 40 is formed with a rectangular frame, and the peripheral frame thereof protrudes to a predetermined height wherein the periphery of the filter paper below portion is seated thereon. The filter paper case 40 may form the bottom surface using a reinforcement structure connecting the peripheral frame through a mesh structure. The fixed shaft 50 includes a left fixed shaft 50-1 and a right fixed shaft 50-2 which are disposed at the left and right surfaces of the filter paper case 40. The left and right fixed shafts 50-1 and 50-2 are coupled in the longitudinal direction of the filter paper case 40, and locked when rotated in the clockwise direction or unlocked when rotated in the counterclockwise direction. The locking operation refers to an operation of lifting the filter paper case 40 to form airtightness while pressing the filter paper 20 located in the filter paper case 40 from the left or right side, and the unlocking operation refers to the reverse operation of the locking operation. Thus, the locking or unlocking operation of the left and right fixed shafts 50-1 and 50-2 may be performed in the same manner as a typical operation which is applied to the frameless filter 10.

In the filter 1, the frameless filter 10 may be fitted and coupled to the filter paper case 40, and the frameless filter 10 and the filter paper case 40 may be integrated with each other in a locking status by an operation of the left and right fixed shafts 50-1 and 50-2. Furthermore, the frameless filter 10 and the filter paper case 40 may be separated from each other in an unlocking status by the reverse operation of the left and right fixed shafts 50-1 and 50-2.

Figure 2:
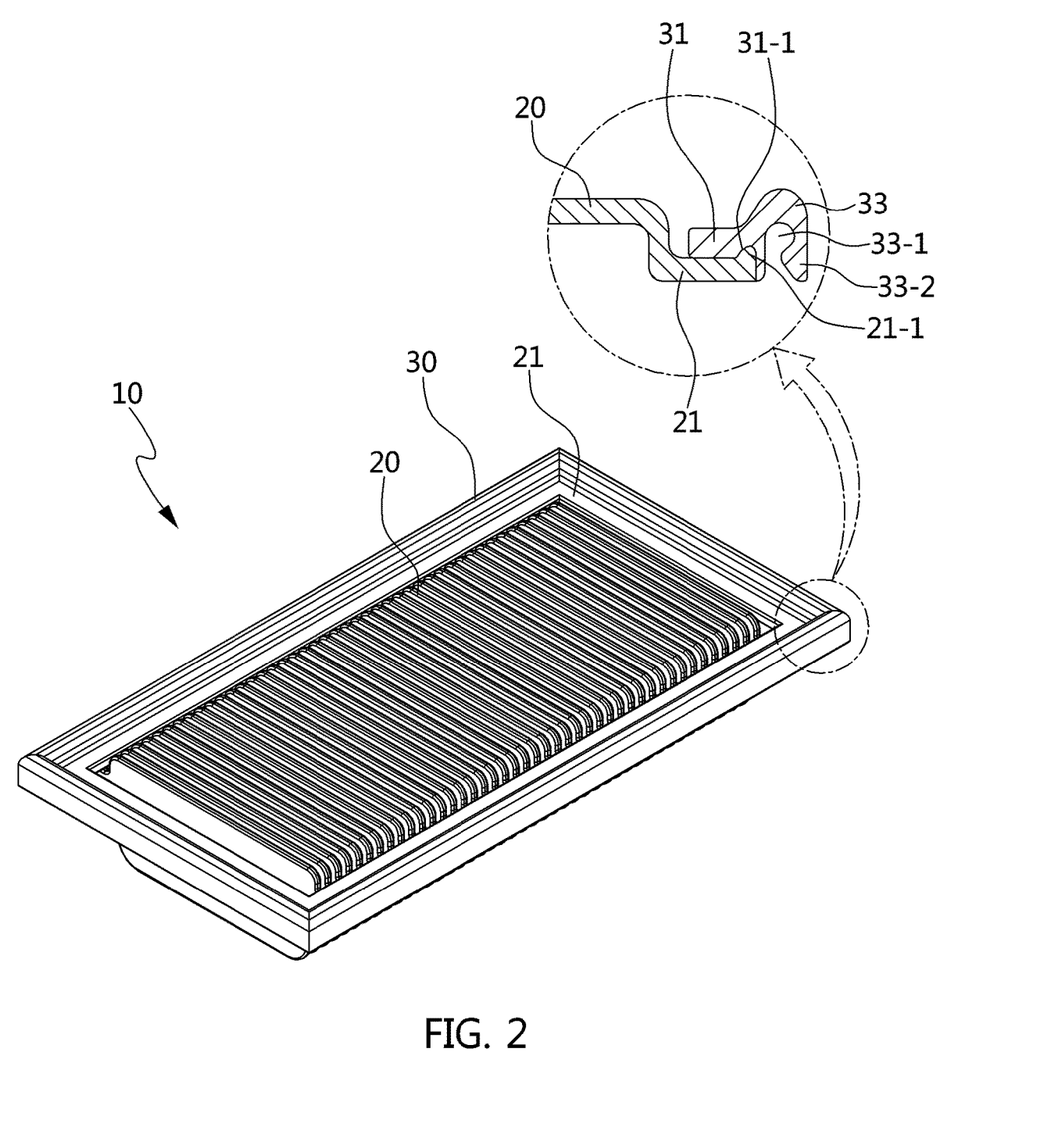
FIG. 2 is a diagram illustrating a self-lock structure between a filter paper and a sealing member in accordance with an exemplary embodiment of the present invention.

FIG. 2 illustrates the coupling status between the filter paper 20 and the sealing member 30.

Specifically, the filter paper 20 has a filter paper end portion 21 formed as the edge portion of the rectangular filter paper body, and the filter paper end portion 21 is formed at a lower level than the top portion surface of the filter paper body and forms a stepped structure with the filter paper body. The filter paper end portion 21 has a filter paper protrusion 21-1 formed at the end portion thereof and protruding at a lower level than the top portion surface of the filter paper body.

The sealing member 30 includes a sealing body 31 formed as a liner portion and a locker lip 33 protruding in a U-shape from the end portion of the sealing body 31 due to a locking protrusion 33-2 of an insert slit 33-1. The sealing body 31 has a filter paper groove 31-1 formed at the end portion of the liner section, and the filter paper protrusion 21-1 is fitted into the filter paper groove 31-1. The locker lip 33 includes a locker lip body having the insert slit 33-1 formed as an entrance opened downward, and the locking protrusion 33-2 is formed at the entrance of the insert slit 33-1 to narrow the entrance.

Therefore, when the filter paper 20 and the sealing member 30 are coupled to each other, the filter paper groove 31-1 and the filter paper protrusion 21-1 are coupled to form a filter paper holding force, with the sealing member 30 pressed against the filter paper end portion 21 through the sealing body 31. Then, the sealing member 30 and the filter paper 20 are integrated with each other. Furthermore, the sealing member 30 is integrated with the filter paper case 40, while forming a self-lock holding force with the filter paper case 40 fitted and coupled to the locker lip 33 connected from the sealing body 31.

Thus, the filter paper 20 and the sealing member 30 are coupled to form the frameless filter 10 using the holding force by the filter paper protrusion 21-1 and the filter paper groove 31-1.

Figure 3:
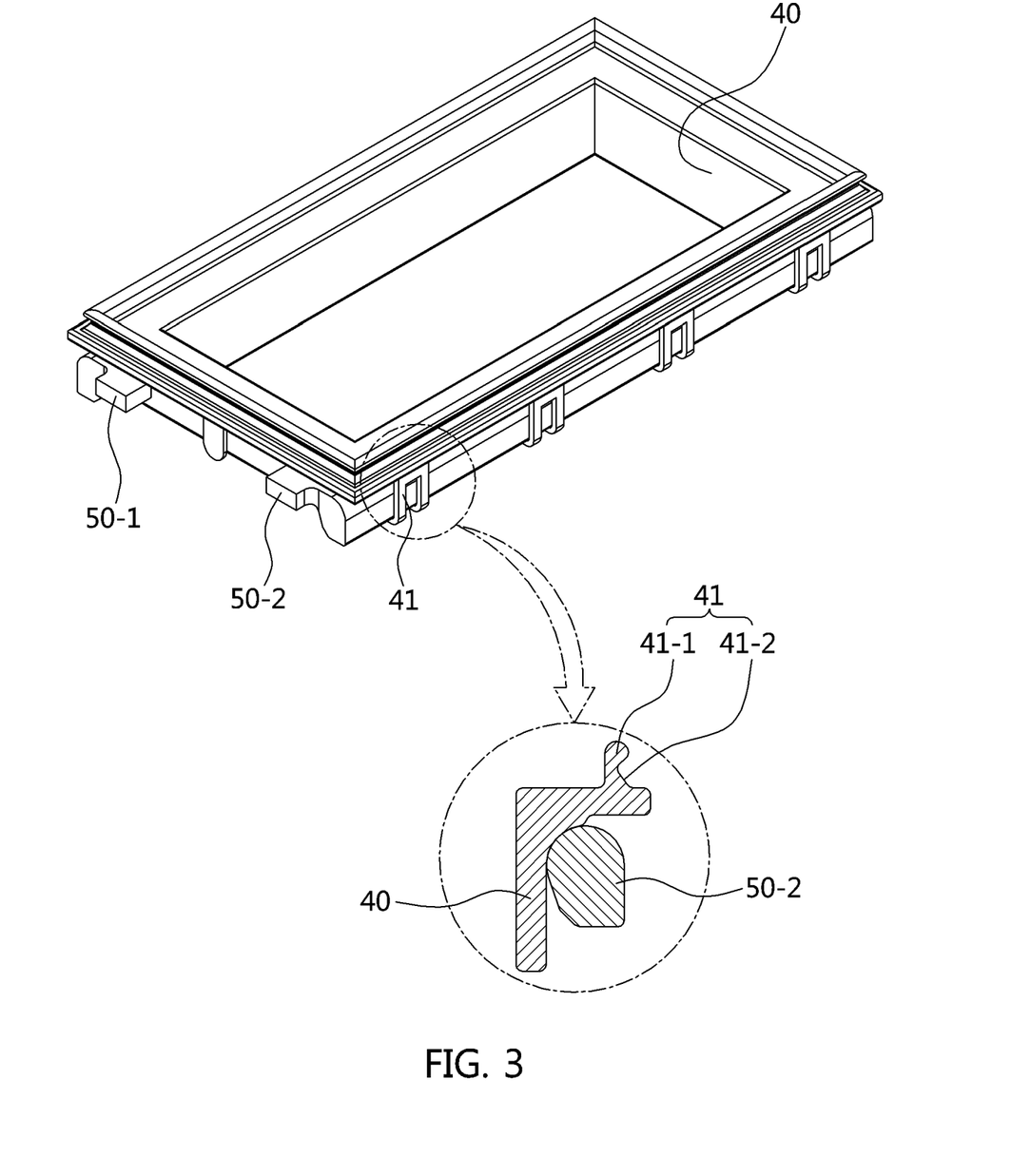
FIG. 3 is a diagram illustrating a self-lock structure formed in a filter paper case in accordance with an exemplary embodiment of the present invention.
Figure 4:
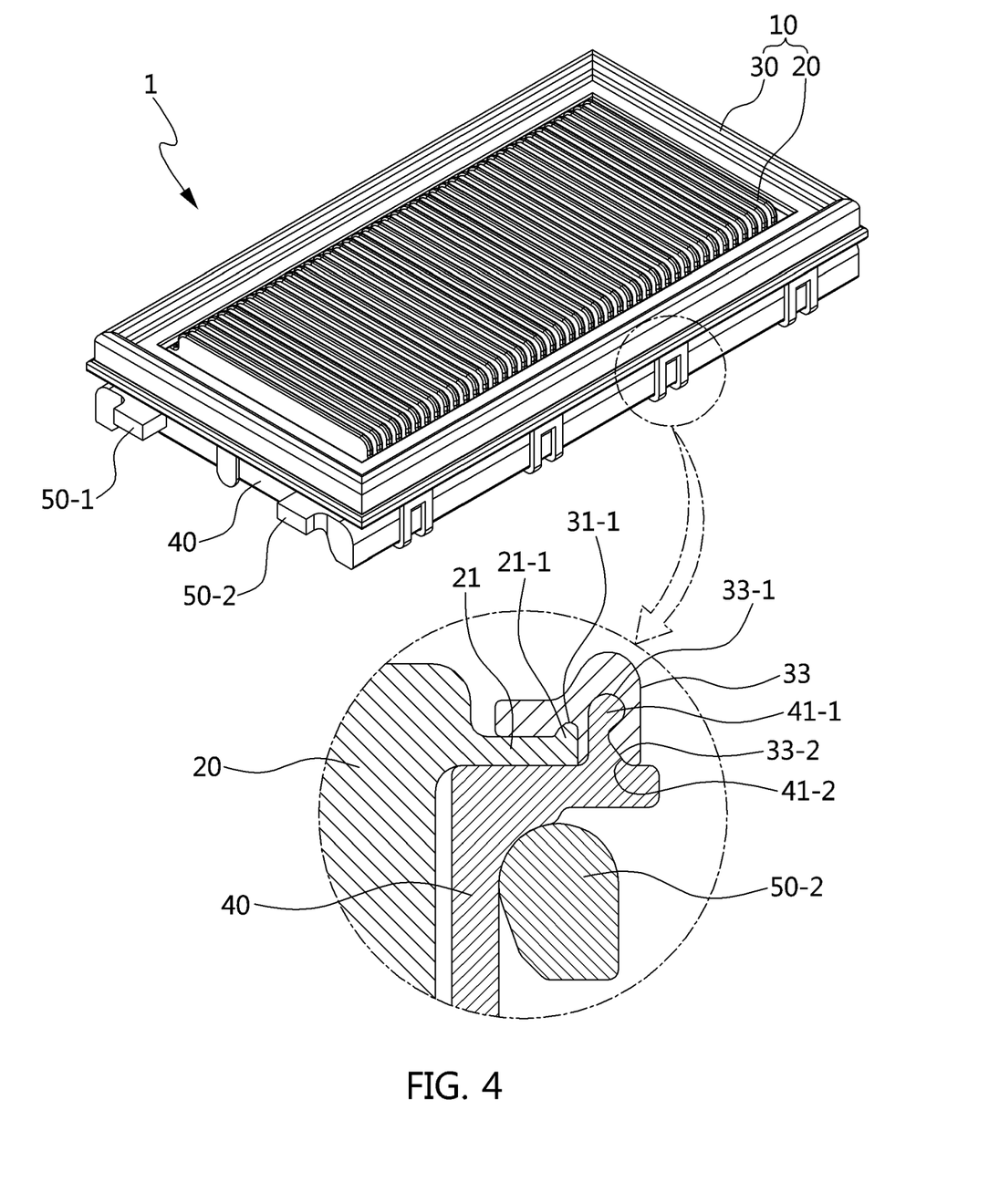
FIG. 4 is a diagram illustrating a state in which a frameless filter and a filter paper case are integrated into a filter through the self-lock structure in accordance with an exemplary embodiment of the present invention.

FIG. 3 and FIG. 4 illustrate the detailed structure of the filter paper case 40 and a state in which the sealing member 30 and the filter paper case 40 are fitted and coupled to form a self-lock holding force.

Referring to FIG. 3, the filter paper case 40 has a horizontal flange which is horizontally extended from the side surface where the right fixed shaft 50-2 (or the left fixed shaft 50-1) is located, and formed as the edge portion of the filter paper case body. The horizontal flange has a locker boss 41 coupled to the locker lip 33 of the sealing member 30. For the present structure, the locker boss 41 includes a restriction protrusion 41-1 formed perpendicular to the horizontal flange and a restriction groove 41-2 formed at a side surface of the restriction protrusion 41-1. The restriction protrusion 41-1 has a circular ball structure formed at the top end thereof, and the side surface of the restriction protrusion 41-1 is formed as a curved surface due to the restriction groove 41-2.

Referring to FIG. 4, when the sealing member 30 and the filter paper case 40 are coupled to each other, the locker boss 41 of the filter paper case 40 may be inserted into the insert slit 33-1 of the sealing member 30, wherein the filter paper case 40 and the sealing member 30 are integrated with each other. Specifically, as the locking protrusion 33-2 is placed against the restriction groove 41-2 while the restriction protrusion 41-1 of the locker boss 41 is inserted into the insert slit 33-1, the circular ball structure of the restriction protrusion 41-1 is restricted by the locking protrusion 33-2.

As a result, the sealing member 30 and the filter paper case 40 may form a self-lock holding force by the restriction of the circular ball structure through the locking protrusion 33-2, while the locker boss 41 is inserted and coupled to the insert slit 33-1.

Thus, when the frameless filter 10 and the filter paper case 40 are coupled and integrated into the filter 1, the filter 1 may increase the rigidity thereof using the self-lock fixing force and the filter paper holding force of the sealing member 30. Therefore, the filter 1 may have a compact size.

Figure 5:
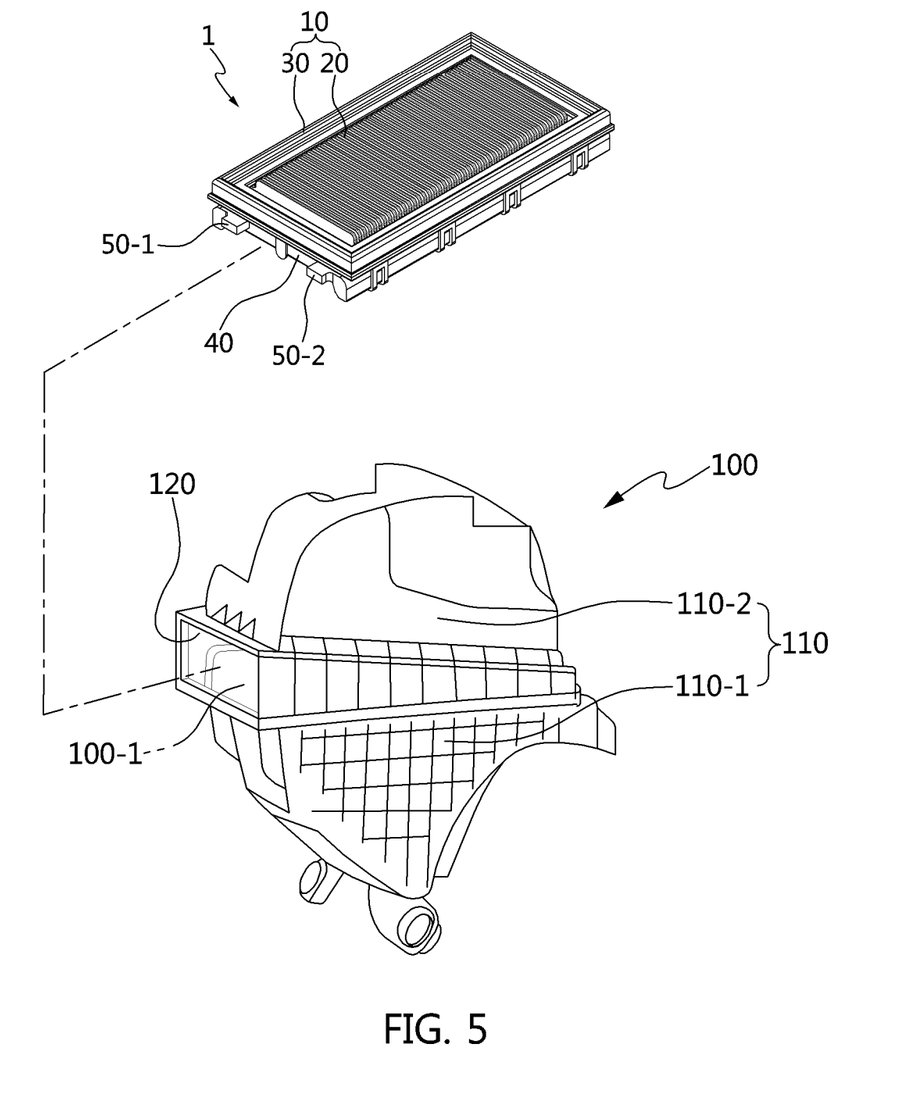
FIG. 5 illustrates an example of a drawer-type air cleaner to which the frameless self-lock filter in accordance with an exemplary present embodiment is applied.
Figure 6:
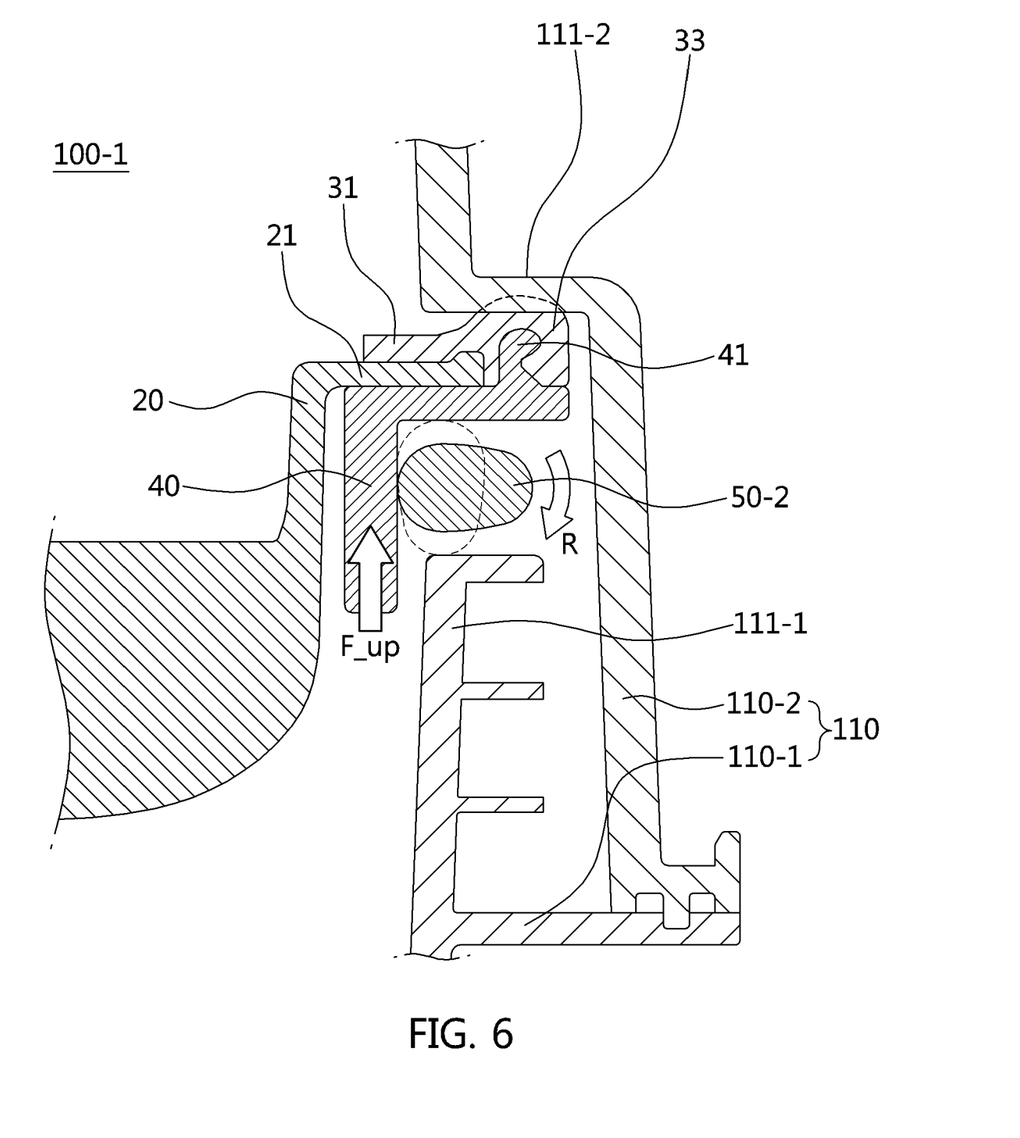
FIG. 6 illustrates an airtight state of the frameless self-lock filter in the internal space of the drawer-type air cleaner in accordance with an exemplary embodiment of the present invention.

FIG. 5 and FIG. 6 illustrate an example of a drawer-type air cleaner 100 to which the filter 1 is applied, the filter 1 including the frameless filter 10 and the filter paper case 40 having the left and right fixed shafts 50-1 and 50-2.

Referring to FIG. 5, the air cleaner 100 includes the filter 1 and an air cleaner housing 110 covered by an air cleaner cover 120 which opens and closes a filter mounting space 100-1 into which the filter 1 is pushed and mounted.

Specifically, the filter 1 includes the frameless filter 10 in which the sealing member 30 is integrated with the filter paper 20 and the filter paper case 40 having the left and right fixed shafts 50-1 and 50-2 disposed at the left and right sides thereof. Thus, the filter 1 has the same structure as the filter 1 described with reference to FIG. 1, FIG. 2, FIG. 3, and FIG. 4. Therefore, when the frameless filter 10 and the filter paper case 40 are coupled, the sealing member 30 not only forms a holding force with the filter paper 20 through the filter paper protrusion 21-1 and the filter paper groove 31-1, but also forms a holding force with the filter paper case 40 through the locker lip 33 and the locker boss 41.

Specifically, the air cleaner housing 110 includes a lower housing 110-1 and an upper housing 110-2 which are coupled to each other or separated from each other, and the lower housing 110-1 and the upper housing 110-2 form the filter mounting space 100-1 therein. The air cleaner cover 120 with a hinged door structure is mounted on the air cleaner housing 110, and opens and closes the filter mounting space 100-1.

Thus, the air cleaner 100 is a drawer-type air cleaner having a mounting structure in which the air cleaner cover 120 is opened in a hinged door manner and the filter 1 is then pushed and mounted in the longitudinal direction of the air cleaner housing 110.

Referring to FIG. 6, the filter 1 is inserted into the filter mounting space 100-1 and switched to the locking status through simultaneous operations of the left and right fixed shafts 50-1 and 50-2, while forming airtightness.

In the air cleaner 100, the filter 1 and the filter mounting space 100-1 have a predetermined gap from each other, but the sealing member 30 may come in contact with the internal surface of the filter mounting space 100-1 while the filter 1 is pushed into the filter mounting space 100-1. However, the sealing member 30 not only forms a filter paper holding force with the filter paper 20 through the filter paper protrusion 21-1 and the filter paper groove 31-1, but also forms a self-lock holding force with the filter paper case 40 through the locker lip 33 and the locker boss 41. Thus, a deformation or movement of the sealing member 30 by the contact can be prevented.

The following descriptions will be based on the supposition that the simultaneous operations of the left and right fixed shafts 50-1 and 50-2 are represented by the operation of the right fixed shaft 50-2, and a rectangular cross-sectional structure acting as a protrusion is applied as the right fixed shaft 50-2.

The filter 1 is pushed into the filter mounting space 100-1 opened by the opened air cleaner cover 120. When the right fixed shaft 50-2 of the filter 1 pushed into the filter mounting space 100-1 is operated and rotated (R) in the clockwise direction, the right fixed shaft 50-2 receives a reaction force from the support surface 111-1 of the lower housing 110-1 while the rectangular cross-portion thereof is shifted, forming an upward force F up to lift the filter paper case 40. Furthermore, the rotation R of the right fixed shaft 50-2 pressurizes the side surface of the filter paper case 40 to restrict the lower portion of the filter paper 20 to some extent. This is a typical effect obtained by the structure of the right fixed shaft 50-2. The support surface 111-1 indicates a portion of the internal wall of the lower housing 110-1 forming the filter mounting space 100-1.

Then, the lifting of the filter paper case 40 by the lifting force F up forms a pressed portion where the sealing member 30 is pressed by the sealing surface 111-2 of the upper housing 110-2, while offsetting the gap between the filter 1 and the filter mounting space 100-1. The pressing of the sealing member 30 causes an elastic deformation to press the locker lip 33 against the sealing surface 111-2. The sealing surface 111-2 indicates a portion of the internal wall of the upper housing 110-2 forming the filter mounting space 100-1.

Thus, the operation of the right fixed shaft 50-2 switches the filter 1 inserted into the filter mounting space 100-1 into the locking status, and the filter 1 ensures sealing performance for the locker lip 33 of the sealing member 30 and the sealing surface 111-2 of the upper housing 110-2.

As described above, the filter 1 applied to the air cleaner 100 in accordance with the present embodiment may include the frameless filter 10 in which the filter paper 20 and the sealing member 30 are integrated with each other; the filter paper case 40 which is fitted and coupled to the sealing member 30 while the filter paper 20 is seated therein, and forms a self-lock holding force for the sealing member 30; and the pair of left and right fixed shafts 50-1 and 50-2 coupled to the left and right side surfaces of the filter paper case 40 and locked when rotated in the clockwise direction or unlocked when rotated in the counterclockwise direction. Thus, the filter 1 may not only have a compact size using the self-lock holding force, but also prevent a local come-off of the filter paper 20 and stably and effectively forms airtightness, when the filter is mounted in the air cleaner housing 110.

In accordance with the exemplary embodiments of the present invention, the air cleaner including the frameless self-lock filter may have the following advantages and effects.

First, when the frameless filter is applied to a drawer-type air cleaner, it is possible to guarantee filter sealing performance which may not be ensured due to the structural limit of the drawer-type air cleaner. Second, the sealing member restriction force for ensuring the filter sealing performance is formed in the frameless filter, which makes it possible to ensure the rigidity of the filter structure. Third, the ensuring of the filter structure rigidity can reduce the size of the filter. Fourth, since the ensuring of the filter structure rigidity can remove the structural limit of the drawer-type air cleaner, a change in design of the drawer-type air cleaner is not required. Fifth, since the performance of the drawer-type air cleaner is improved without a design change, the adaptability to existing drawer-type air cleaners can be improved. Sixth, when the filter of the drawer-type air cleaner is replaced, users' convenience can be improved, and malfunctions can be prevented.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, tot hereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A filter apparatus comprising;
    a frameless filter having a sealing member coupled to an edge portion of a filter paper which filters foreign matters; and
    a filter paper case having a seating space of the filter paper, and fitted and coupled to the sealing member to form a self-lock holding force with the sealing member,
    wherein the filter paper case has a fixed shaft which is rotated in a clockwise direction or a counterclockwise direction thereof, and the fixed shaft includes a first fixed shaft coupled to a first side surface of the filter paper case and a second fixed shaft coupled to a second side surface of the filter paper case.

2. The filter apparatus of claim 1, wherein the filter paper includes non-woven fabric, and the sealing member includes urethane.

3. The filter apparatus of claim 2, wherein the filter paper is folded with air permeability, and manufactured through a compression molding method.

4. The filter apparatus of claim 1, wherein the sealing member includes a sealing body seated on the edge portion of the filter paper and a locker lip integrated with the sealing body and having an insert slit fitted and coupled to the edge portion of the filter paper case, the insert slit being opened downward therefrom.

5. The filter apparatus of claim 4, wherein the filter paper has a filter paper protrusion formed on a filter paper end portion forming the edge portion thereof, the sealing body has a filter paper groove formed therein, and the filter paper protrusion and the filler paper groove are coupled to form a filter paper holding force.

6. The filter apparatus of claim 4, wherein the filter paper case includes a locker boss forming an edge portion thereof, the locker boss having a restriction protrusion formed thereon, and the restriction protrusion and the insert slit are fitted and coupled to form the self-look holding force.

7. The filter apparatus of claim 6, wherein the locker boss has a restriction groove formed under the restriction protrusion, the insert slit has a locking protrusion formed thereon, and the locking protrusion is disposed against the restriction groove.

8. An air cleaner comprising:
    a filter apparatus including:
        a frameless filter having a sealing member coupled to an edge portion of a filter paper which is folded with air permeability and filters foreign matters;

a filter paper case fitted and coupled to the sealing member to form a self-lock holding force with the sealing member, while the filter paper is seated in a filter paper seating space; and a pair of first and second fixed shafts coupled to first and second side surfaces of the filter paper case, respectively, and operated in a clockwise direction to form a locking status or operated in a counterclockwise direction thereof to form an unlocking status; and an air cleaner housing having a filter mounting space in which the filter is mounted.

9. The air cleaner of claim 8, wherein the air cleaner housing has an air cleaner cover which opens or closes the filter mounting space hingedly.

10. The air cleaner of claim 8, wherein the air cleaner housing includes a lower housing and an upper housing which form the filter mounting space, and the upper housing has a sealing surface to form airtightness with the filter.

11. The air cleaner of claim 10, wherein the airtightness between the filter and the sealing Surface is formed by the sealing member.

\* \* \* \* \*